(12) United States Patent
Sethi et al.

(10) Patent No.: US 11,775,280 B1
(45) Date of Patent: Oct. 3, 2023

(54) DETERMINE THE KEY IDENTIFIER ON THE SYSTEM TO DECIDE THE UPGRADE STRATEGY

(71) Applicant: Dell Products L.P., Round Rock, TX (US)

(72) Inventors: Parminder Singh Sethi, Ludhiana (IN); Lakshmi Nalam, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 57 days.

(21) Appl. No.: 17/722,792

(22) Filed: Apr. 18, 2022

(51) Int. Cl.
*G06F 8/65* (2018.01)
*G06F 11/36* (2006.01)
*G06F 9/445* (2018.01)
*H04L 67/60* (2022.01)
*G06F 9/455* (2018.01)

(52) U.S. Cl.
CPC .................... *G06F 8/65* (2013.01)

(58) Field of Classification Search
CPC .......... G06F 9/455; G06F 8/60; G06F 21/577; G06F 8/65; G06F 1/3212; G06F 9/45508; G06F 11/362; G06F 8/61; H04L 67/34; G06Q 30/00; G06Q 50/06
See application file for complete search history.

(56) References Cited

U.S. PATENT DOCUMENTS 10,452,377 B2 * 10/2019 Musani ................ G06F 11/362

* cited by examiner

*Primary Examiner* — Thuy Dao
(74) *Attorney, Agent, or Firm* — Chamberlain, Hrdlicka, White, Williams, & Aughtry (57) ABSTRACT

One or more embodiments of this invention may improve the operating and upgrading of computing devices and systems. The computing device and/or system may receive information related to a plurality of application upgrades from an application monitoring agent. Based on the received information, a device emulation will be requested, and an emulation will be performed in response to generate an application upgrade strategy including such things as emulated (e.g., predicted) upgrade times. In order to produce a more refined upgrade strategy the various embodiments also consider key aspects of the device and the upgrades to produce one or more key identifiers. The key identifiers are monitored throughout the upgrade process and are used to refine the upgrade strategy.

20 Claims, 7 Drawing Sheets

DETERMINE THE KEY IDENTIFIER ON THE SYSTEM TO DECIDE THE UPGRADE STRATEGY

BACKGROUND

Computing devices in a system may include any number of internal components such as processors, memory, and persistent storage. The computing devices may execute applications (e.g., software) which may need to be upgraded periodically to protect from security vulnerabilities and to add new or improved features. However, performing the upgrades in a large system with multiple processors and storage devices may require more than a one-size fits all strategy for performing the upgrade.

SUMMARY

In general, certain embodiments described herein relate to a method for upgrading a client device. The method comprises performing an emulation in a device emulation system to generate an application upgrade strategy that applies at least one application upgrade on the client device. The method then determines, by the device emulation system, using the application upgrade strategy and the client device statistics, at least one key identifier of the client device. Once the method determines application upgrade strategy, the method then uses, by the device emulation system, the at least one key identifier to modify the application upgrade strategy to produce a final application upgrade strategy. The method then sends, by the device emulation system, the final application upgrade strategy to a client device upgrade manager to perform the application upgrade strategy.

In general, certain embodiments described herein relate to a non-transitory computer readable medium comprising computer readable program code. When executed by a computer processor the computer readable program code enables the computer processor to perform a method for upgrading a client device. The method comprises performing an emulation in a device emulation system to generate an application upgrade strategy that applies at least one application upgrade on the client device. The method then determines, by the device emulation system, using the application upgrade strategy and the client device statistics, at least one key identifier of the client device. Once the method determines application upgrade strategy, the method then uses, by the device emulation system, the at least one key identifier to modify the application upgrade strategy to produce a final application upgrade strategy. The method then sends, by the device emulation system, the final application upgrade strategy to a client device upgrade manager to perform the application upgrade strategy.

In general, certain embodiments described herein relate to a system. The system includes a client device, a client device upgrade manager, and a device emulation system. At least the device emulation system includes at least one processor and a memory comprising instructions, which when executed by the at least one processor, performs a method. The method comprises performing an emulation in a device emulation system to generate an application upgrade strategy that applies at least one application upgrade on the client device. The method then determines, by the device emulation system, using the application upgrade strategy and the client device statistics, at least one key identifier of the client device. Once the method determines application upgrade strategy, the method then uses, by the device emulation system, the at least one key identifier to modify the application upgrade strategy to produce a final application upgrade strategy. The method then sends, by the device emulation system, the final application upgrade strategy to a client device upgrade manager to perform the application upgrade strategy.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Electronic devices and computing systems often require frequent software or firmware updates or upgrades. The upgrades often require significant resources and/or time to be performed. Electronic devices and computing systems are often complex and comprising of multiple components that may originate from more than one manufacturer and use a plethora of applications/software from yet further providers and/or manufacturers. Since the upgrades can come from both the manufacturer and other third parties, it is difficult to predict how any one upgrade will perform and how much time/resources will be needed for a specific upgrade. To overcome this, in general, one or more of the embodiments of the invention are directed to determine an upgrade strategy, which takes in to account the device's configuration and specifics of the software update.

More specifically, various embodiments of the invention may receive information related to a plurality of application upgrades from an application monitoring agent. Based on the received information, a device emulation will be requested, and an emulation will be performed in response to generate an application upgrade strategy along including such things as emulated (e.g., predicted) upgrade times. In order to produce a more refined upgrade strategy the various embodiments also consider key aspects of the device and the upgrades to produce one or more key identifiers. The key identifiers are monitored throughout the upgrade process and are used to refine the upgrade strategy.

In response to the upgraded strategy as well as user or administrator feedback, the final application upgrade strategy will be initiated (e.g., instantiated, executed, etc.). This advantageously allows for the upgrade process to be customized to a particular electronic device/system resulting in less inconvenience and issues with performing the upgrade. One or more embodiments of the invention further provide the advantage of allowing a user or administrator to have a much clearer view about the upgrade process and allow them to customize both the upgrade and the system. These and other features of the various embodiments of the invention will increase the likelihood that an upgrade will be performed and completed successfully in a timely manner.

The following describes various embodiments of the invention.

Figure 1:
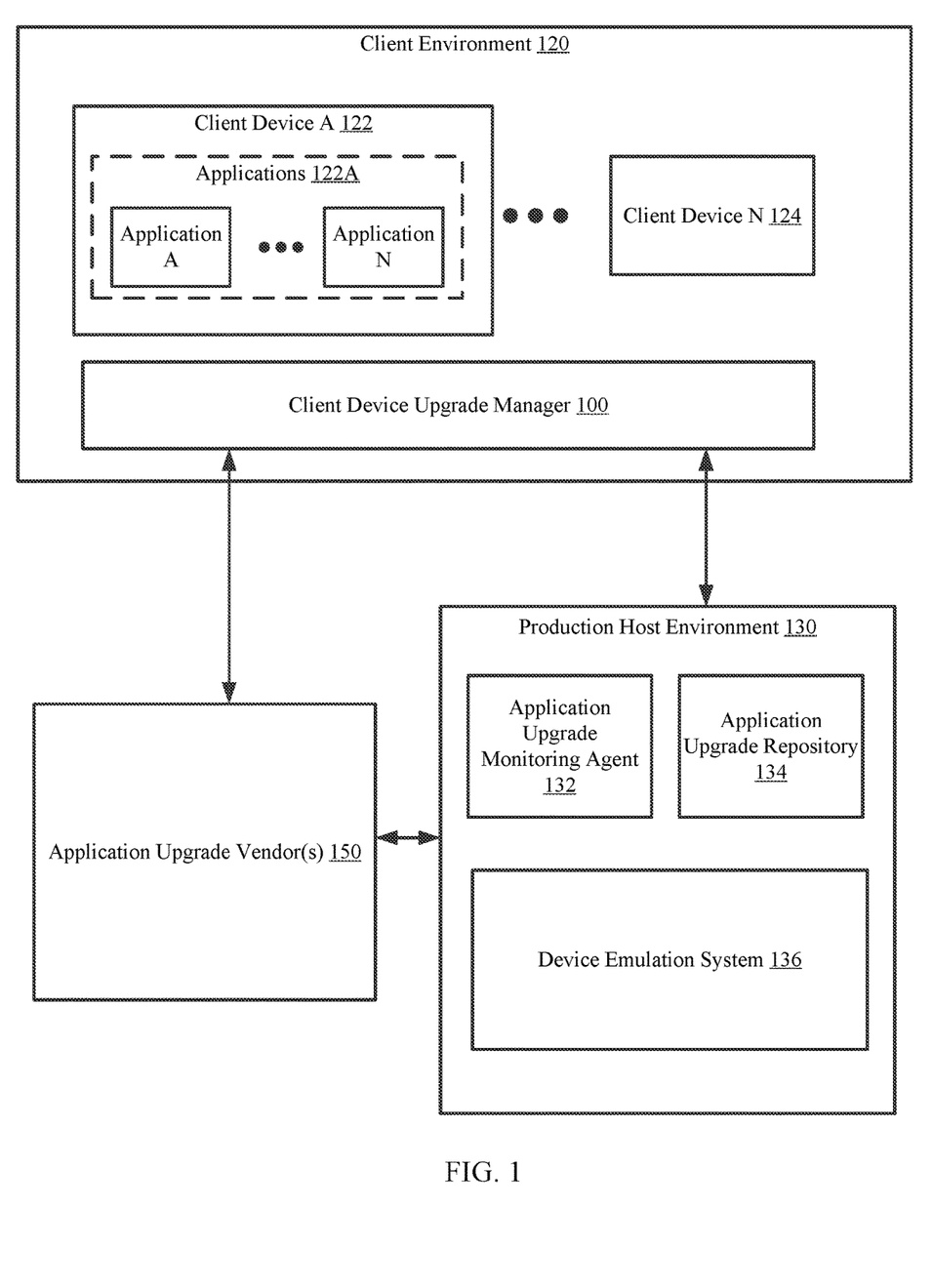
FIG. 1 shows a diagram of a system in accordance with one or more embodiments of the invention.

FIG. 1 shows a diagram of a system in accordance with one or more embodiments of the invention. The system includes a client environment (120), one or more application vendors (150), and a production host environment (130). The system may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the client environment (120) may include client devices (client device A (122), client device N (124)) and a client device upgrade manager (100). The client devices (client device A (122), client device N (124)) and the client device upgrade manager (100) may be physical or logical devices, as discussed below.

In one or more embodiments of the invention, each client device (client device A (122), client device N (124)) may include one or more applications (122A). As shown in FIG. 1, the applications (122A) may include application A to application N. The applications (122A) may be logical entities executed using computing resources (not shown) of the client devices (client device A (122), client device N (124)). Each of the applications (122A) may perform similar or different processes. In one or more embodiments of the invention, the applications (122A) may provide services to users (e.g., clients (not shown)) of the client devices (client device A (122), client device N (124)). For example, the applications (122A) may host services and/or components. The services and/or components may be, for example but are not limited to instances of databases, email servers, etc. The applications (122A) may host other types of services and/or components without departing from the scope of the invention.

Figure 4:
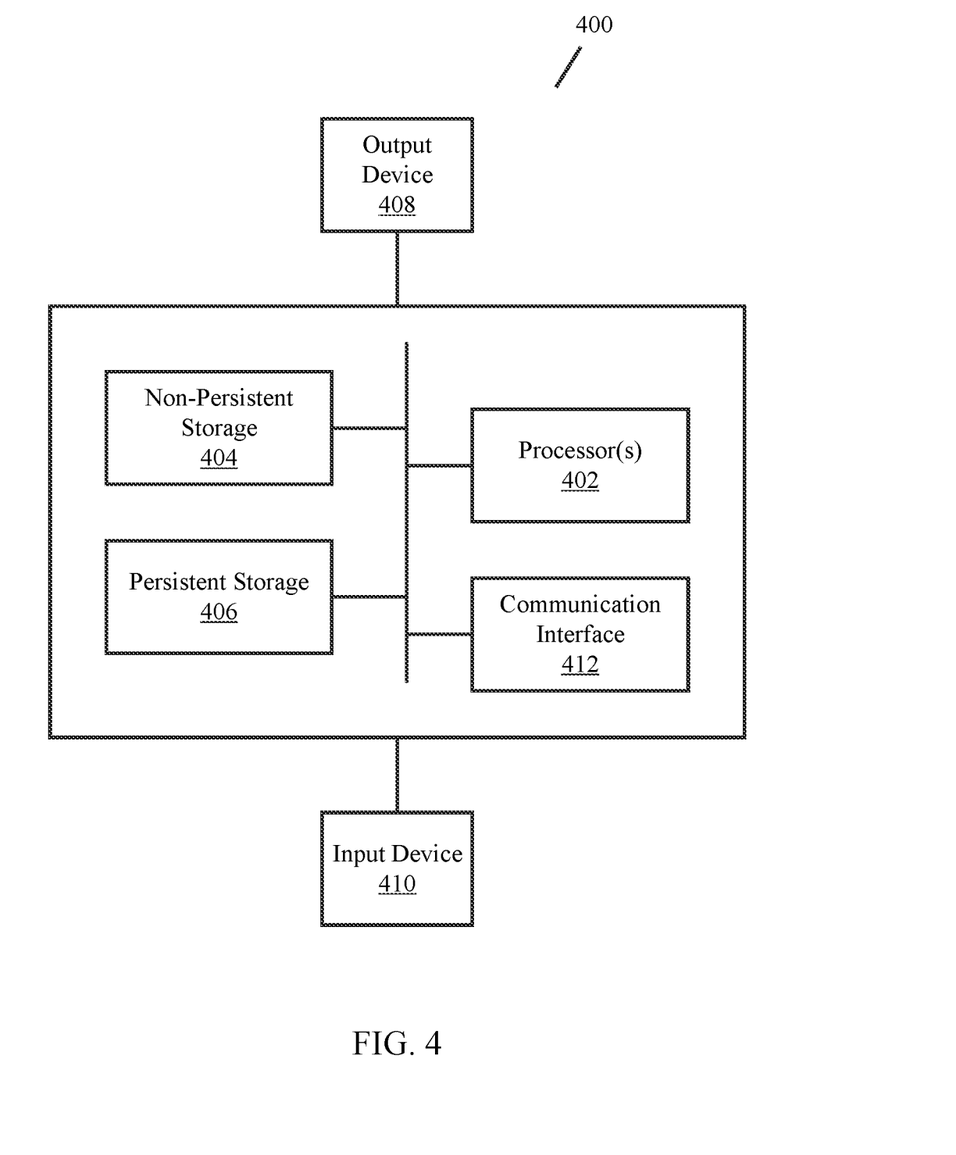
FIG. 4 shows a diagram of a computing device in accordance with one or more embodiments of the invention.

In one or more embodiments of the invention, each client device (client device A (122), client device N (124)) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client device (client device A (122), client device N (124)) described throughout this application.

Alternatively, in one or more embodiments of the invention, each client device (client device A (122), client device N (124)) may be implemented as a logical device. The logical device may utilize the computing resources of any number of computing devices to provide the functionality of each client device (client device A (122), client device N (124)) described throughout this application.

In one or more embodiments of the invention, the applications (122A) may be upgraded based on newer versions available for installation. The installation of application upgrades may be performed and/or otherwise initiated by the client device upgrade manager (100). The client device upgrade manager (100) may also periodically collect information (e.g., client device state and configuration information) from the client devices (client device A (122), client device N (124)).

In one or more embodiments of the invention, the applications (122A) may be implemented as computer instructions, e.g., computer code, stored on a persistent storage that when executed by a processor(s) of a computing device cause the computing device (e.g., 400, FIG. 4) to provide the functionality of the applications (122A) described throughout this application.

In one or more embodiments of the invention, the client device upgrade manager (100) may then send this information to the application vendor(s) (150) for technical support (e.g., recommendations and/or fixes for hardware and/or software failures) to the client devices (client device A (122), client device N (124)). The client device upgrade manager (100) may also identify the client devices (client device A (122), client device N (124)) that require an application upgrade. The application vendor(s) (150) may then provide one or more catalog files (described in more detail below) that specify the requirements of the identified client devices (client device A (122), client device N (124)) to the production host environment (130).

In one or more embodiments of the invention, the client device upgrade manager (100) may obtain the estimated time that one or more application upgrades may take. The client device upgrade manager (100) may obtain the application upgrade time estimation from the production host environment (130). The client device upgrade manager (100) may then provide the application upgrade time estimation and optimal time slots in which the application upgrade may be performed to the identified client devices (client device A (122), client device N (124)).

In one or more embodiments of the invention, the client device upgrade manager (100) may further include functionality of monitoring device configuration information of the client devices (client device A (122), client device N (124)). The device configuration information of the client devices (client device A (122), client device N (124)) may include, but it is not limited to: operating system information of a client device, the number of applications already installed to a client device, current versions of such applications already installed to a client device, processing power of a client device, etc. The device configuration information of the client devices (client device A (122), client device N (124)) may be provided to the production host environment (130).

The device configuration information of the client devices (client device A (122), client device N (124)) may also include other details without departing from the scope of the invention.

In one or more embodiments of the invention, the client device upgrade manager (100) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device upgrade manager (100) described throughout this application.

Alternatively, in one or more embodiments of the invention, similar to the client devices (client device A (122), client device N (124)), the client device upgrade manager (100) may also be implemented as a logical device, as discussed above.

Turning back to the production host environment (130), in one or more embodiments of the invention, the production host environment (130) may include an application monitoring agent (132), an application upgrade repository (134), and a device emulation system (136). The production host environment (130) may include additional, fewer, and/or different components without departing from the scope of the invention.

In one or more embodiments of the invention, the production host environment (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

Alternatively, in one or more embodiments of the invention, similar to the client devices (client device A (122), client device N (124)), the production host environment (130) may also be implemented as a logical device, as discussed above.

In one or more embodiments of the invention, the application upgrade repository (134) may store versions of the application upgrade(s). The application upgrade repository (134) may be updated by the application vendor(s) (150) based on newer versions of the application upgrade(s) being available. The application upgrade repository (134) may further store catalog files related to the application upgrade(s) to be installed. The catalog files may include, for example, but are not limited to a compatible device model, a minimum application version for the application upgrade to be installed, a compatible operating system (and corresponding version of such operating system), an upgrade sequence, etc.

In one or more embodiments of the invention, the application monitoring agent (132) may push the application upgrade(s) to the client device upgrade manager (100). The application monitoring agent (132) may also obtain a list of the client devices (client device A (122), client device N (124)) that are managed by the client device upgrade manager (100). The application monitoring agent (132) may further obtain the information related to the application(s) already installed to those client devices (client device A (122), client device N (124)) from the client device upgrade manager (100).

In one or more embodiments of the invention, the application monitoring agent (132) may monitor the application upgrade repository (134) to identify the application upgrade(s) available in the application upgrade repository (134). The application monitoring agent (132) may then identify one or more client devices (client device A (122), client device N (124)) that are compatible with the application upgrade based on the catalog files related to the application upgrade in the application upgrade repository (134).

In one or more embodiments of the invention, in response to an emulated application upgrade (e.g., an emulation of an application upgrade that is to be performed on an emulated client device (e.g., device A emulation (224), described below in reference to FIG. 2)), the application monitoring agent (132) may initiate an estimation of performing the application upgrade on one or more of the client devices (client device A (122), client device N (124)). The application upgrade estimation(s) may then be provided to the client device upgrade manager (100).

In one or more embodiments of the invention, the application monitoring agent (132) may further send information related to the application upgrade to a device emulation orchestration engine (e.g., 210, FIG. 2), which is part of the device emulation system (136). In one or more embodiments of the invention, the information related to the application upgrade may include, but it is not limited to: application version of an application upgrade, supported operating system version(s) for an application upgrade, etc. The information related to the application upgrade may also include other details without departing from the scope of the invention.

In one or more embodiments of the invention, the application monitoring agent (132) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the application monitoring agent (132) described throughout this application.

Alternatively, in one or more embodiments of the invention, similar to the client devices (client device A (122), client device N (124)), the application monitoring agent (132) may also be implemented as a logical device, as discussed above.

In one or more embodiments of the invention, the device emulation system (136) may be a system of device emulation containers (e.g., device emulation container A (220), device emulation container N (230), described below in reference to FIG. 2) that may be configured to emulate the client devices (client device A (122), client device N (124)). The emulation of the client devices (client device A (122), client device N (124)) may be used for applying the application upgrade to the emulated devices and measuring application upgrade metrics.

In one or more embodiments of the invention, the application upgrade metrics may include, but they are not limited to: the time taken to complete the application upgrade, the number of reboots required after performing the application upgrade, etc. The application upgrade metrics may also include other details not listed above without departing from the scope of the invention. Additional details regarding the device emulation system (136) are described below in reference to FIG. 2.

In one or more embodiments of the invention, the device emulation system (136) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation system (136) described throughout this application.

Alternatively, in one or more embodiments of the invention, similar to the client devices (client device A (122), client device N (124)), the device emulation system (136) may also be implemented as a logical device, as discussed above.

Figure 2:
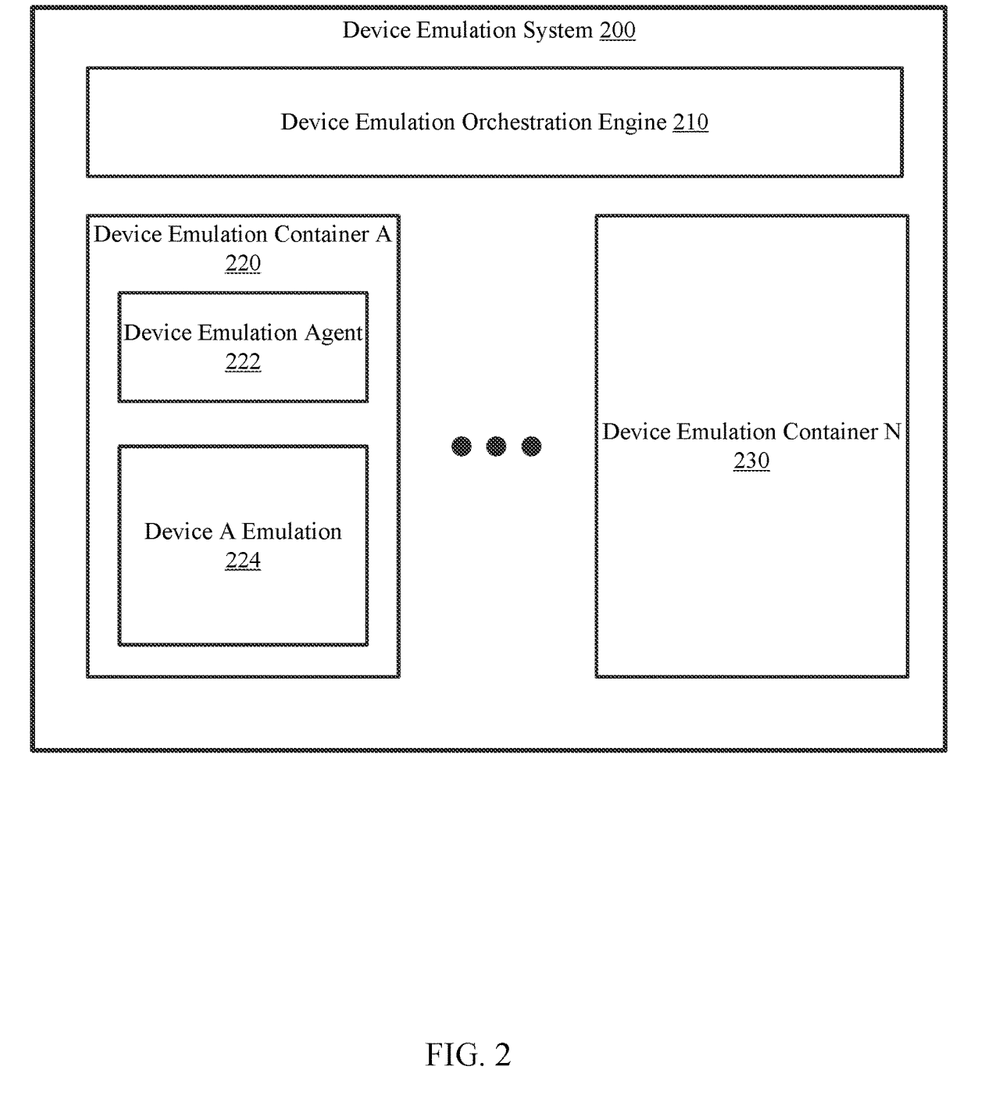
FIG. 2 shows a diagram of a device emulation system in accordance with one or more embodiments of the invention.

Turning now to FIG. 2, FIG. 2 shows a diagram of a device emulation system in accordance with one or more embodiments of the invention. The device emulation system (200) may be an example of the device emulation system (e.g., 136, FIG. 1) discussed above, in which the device emulation system (e.g., 136, FIG. 1) emulates the client devices (e.g., client device A (122), client device N (124), FIG. 1). The device emulation system (200) may include the device emulation orchestration engine (210) and one or more device emulation containers (device emulation container A (220), device emulation container N (230)). The device emulation system (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the device emulation orchestration engine (210) orchestrates the generation of the device emulation containers (device emulation container A (220), device emulation container N (230)). The emulation containers (220-230) can take the form of a sandbox where the containers have limited or no access to the operating client devices. For example, the device emulation orchestration engine (210) may receive request(s) from the application monitoring agent (e.g., 132, FIG. 1) to emulate an application upgrade on an emulated client device (e.g., device A emulation (224)). The device emulation orchestration engine (210) may then initiate the emulation of the client devices (e.g., client device A (122), client device N (124), FIG. 1) and the application upgrade.

In one or more embodiments of the invention, the device emulation orchestration engine (210) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the device emulation orchestration engine (210) described throughout this application.

Alternatively, in one or more embodiments of the invention, similar to the client devices (e.g., client device A (122), client device N (124), FIG. 1), the device emulation orchestration engine (210) may also be implemented as a logical device, as discussed above, and be configured as a sandbox.

Continuing the discussion of FIG. 2, in one or more embodiments of the invention, the device emulation containers (device emulation container A (220), device emulation container N (230)) may include a device emulation agent (222) that monitors the application upgrade(s) executing on the emulated client device (device A emulation (224)). More specifically, the device emulation agent (222) may monitor, for example, the application upgrade(s) performed on the emulated client device (device A emulation (224)) to measure the time taken to perform each application upgrade and to track the number of reboots performed after each application upgrade.

In one or more embodiments of the invention, the monitored parameters may then be used to evaluate the application upgrade(s) and based on this evaluation, to determine whether the application upgrade(s) should be pushed out to the client device (e.g., client device A (122), client device N (124), FIG. 1).

In one or more embodiments of the invention, the device emulation agent (222) may perform an emulation to generate an application upgrade strategy for the emulated client device (device A emulation (224)). In one or more embodiments of the invention, the application upgrade strategy may be generated based on the available application upgrades for the client device (e.g., client device A (122), client device N (124), FIG. 1) in the application upgrade repository (e.g., 134, FIG. 1).

In one or more embodiments of the invention, the application upgrade strategy (not shown) may be generated in an iterative manner. For example, multiple application upgrade strategies may be evaluated to find the most efficient application upgrade strategy for performing the application upgrades on the emulated client device (device A emulation (224)). For this purpose, hardware capabilities of the emulated client device (device A emulation (224)), including, but not limited to, storage capability of the random-access memory, processing power of one or more processors may be considered while generating the application upgrade strategies. Other hardware capabilities of the emulated client device (device A emulation (224)) not listed above may also be considered without departing from the scope of the invention.

Further based on earlier upgrade strategy iterations, it may be determined that specific hardware capabilities or configurations of both the hardware and applications may be important to refining the application upgrade strategy. The specific capabilities and configurations can include such aspects of the hardware as battery status (for a system operating on battery power instead of using an external source of power), storage device capacity (for example hard drive capacity), network capacity, current and future application use, and many other aspects of the system. These aspects, or key identifiers, are determined and used to refine the application upgrade strategy both during and after the application upgrade strategy is formulated as will now be discussed with regards to FIGS. 3A-3D

FIGS. 3A-3D show a method to determine an upgrade strategy in accordance with one or more embodiments of the invention. While the various steps in the method are presented and described sequentially, those skilled in the art will appreciate that some or all of the steps may be executed in different orders, may be combined, or omitted, and some or all steps may be executed in parallel without departing from the scope of the invention.

Figure 3A:
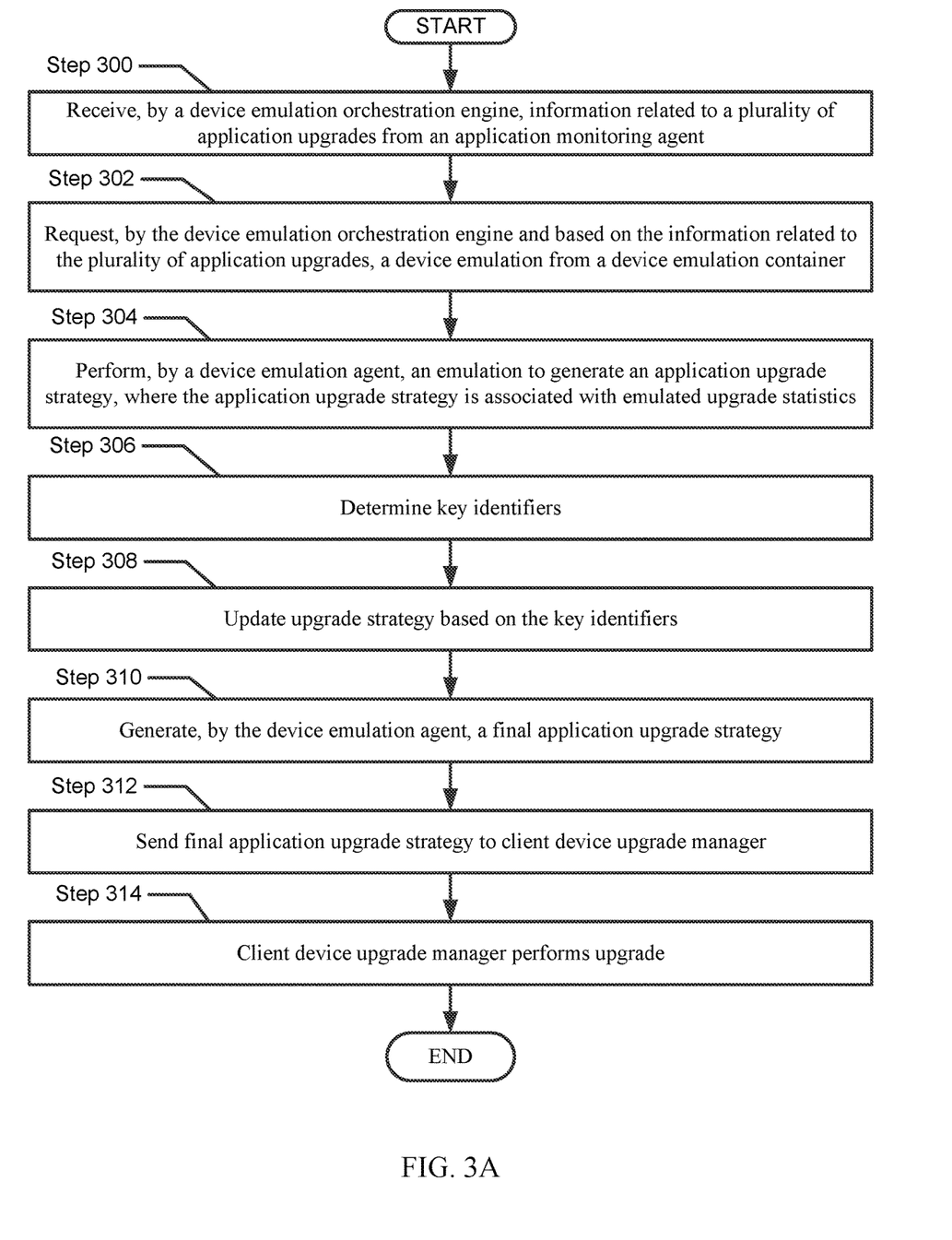
FIGS. 3A-3D show methods for determining an application upgrade strategy and performing the upgrade based on the application upgrade strategy.

Turning now to FIG. 3A, the method shown in FIG. 3A may be performed by, for example, the application monitoring agent (e.g., 132, FIG. 1), the device emulation orchestration engine (e.g., 210, FIG. 2), the device emulation container (e.g., device emulation container A (220), device emulation container N (230)), and the device emulation agent (e.g., 222, FIG. 2). Other components of the system illustrated in FIG. 1 may also contribute to the performance of the method shown in FIG. 3A without departing from the scope of the invention.

In Step 300, information related to a plurality of application upgrades from an application monitoring agent is received. In one or more embodiments of the invention, the information related to the plurality of application upgrades may be received by the device emulation orchestration engine.

In one or more embodiments of the invention, prior to sending the information related to the plurality of application upgrades to the device emulation orchestration engine, the application monitoring agent may have received this information from the application upgrade repository (e.g., 134, FIG. 1).

Additionally, the device configuration information of the client device that is to be upgraded using the plurality of application upgrades (e.g., a client device that requested the plurality of application upgrades) may be obtained prior to receiving the information related to the plurality of application upgrades.

In one or more embodiments of the invention, the information related to the plurality of application upgrades may include, but it is not limited to: application version information of each application upgrade, computing device information of the client device, etc. The information related to the plurality of application upgrades may also include other details not listed above without departing from the scope of the invention.

In one or more embodiments of the invention, the device configuration information of the client device may specify the configuration of the client device that requested the plurality of application upgrades. The configuration of the client device may include, for example: a current version of the operating system of the client device, the amount of memory available for the client device, a number of applications executing on the client device, the amount of available persistent storage of the client device, etc. Other types of client device configurations not listed above may also be specified in the device configuration information without departing from the scope of the invention.

In step 302, a device emulation is requested from a device emulation container. In one or more embodiments of the invention, based on the information related to the plurality of application upgrades, the device emulation may be requested by the device emulation orchestration engine.

In one or more embodiments of the invention, the device emulation request may specify applying the plurality of application upgrades to an emulated device of a corresponding client device. The device emulation request may also specify monitoring the installation of the plurality of application upgrades to obtain the application upgrade metrics. Other tasks not listed above may also be specified in the device emulation request without departing from the scope of the invention. Details regarding the application upgrade metrics are described above in reference to FIG. 1.

In one or more embodiments of the invention, while performing the device emulation of the corresponding client device, a set of upgrade estimations for each application upgrade may be obtained from the device emulation agent. The set of upgrade estimations may specify, for example, an estimated completion time for each application upgrade to be applied to the client device. In one or more embodiments of the invention, the set of upgrade estimations may further specify the number of restarts required after all application upgrades have been applied. Other parameters not listed above may also be specified by the set of upgrade estimations without departing from the scope of the invention. The set of upgrade estimations may then be provided to the device emulation orchestration engine.

Continuing the discussion of FIG. 3A, in step 304, an emulation to generate an application upgrade strategy is performed by the device emulation orchestration engine. In one or more embodiments of the invention, the emulation to generate the application upgrade strategy may be performed by the device emulation agent. During the generation of the application upgrade strategy, the set of upgrade estimations and the application upgrade metrics may be considered.

To generate the emulation, the client device emulation may obtain application logs and system logs of the emulated client device. In one or more embodiments of the invention, the application logs may include, but are not limited to: information related to a task scheduler history, information related to a domain name system (DNS) change, etc. Further information on the system such as battery usage, storage device capacity, etc. may be obtained along with the system logs that may include, but are not limited to: information related to a client device's CPU usage, information related to a newly detected universal serial bus (USB) device, etc.

In one or more embodiments of the invention, based on the obtained application logs and the system logs, the OS of the client device emulation may access the various logs and telemetry of the system to emulate the system and the application upgrade. This information may then be provided to the device emulation agent.

In Step 306, the key identifiers are determined. As discussed more with regards to the method of FIG. 3B, the key identifiers are obtained based on the emulated upgrade strategy and device telemetry. The key identifiers are characteristics of the system that are most pertinent to the upgrade strategy.

An example of a key identifier would be the amount of battery time left, if the upgrade strategy is such that the upgrade would require a significant uninterrupted time for performing the upgrade. For example, if the upgrade strategy found that the upgrade needed two hours of uninterrupted time, and the key identifier of battery reserves shows that only one hour of battery power was left, then the system would conclude that the upgrade strategy would need to be altered as discussed in step 308 to be performed in less than one hour.

Other key identifiers can be used instead or in addition in one or more embodiments of the invention. One such key identifier would be the amount of storage left on a storage drive. Another key identifier according to one or more embodiments of the invention, would be system usage (for example if the system is used at 90% capacity at 10 a.m. but only 10% capacity at 1 a.m., then it may be desirous to have the upgrade strategy include having the upgrade performed at 1 a.m. instead of at 10 a.m.). Other key identifiers such as network capacity, processor capacity, critical applications, etc. not described in more detail herein can also be considered.

In step 308, the upgrade strategy is updated based on the key identifiers. Once the key identifiers are determined as discussed above and in more detail with regards to the method of FIG. 3B, the device emulation agent updates the upgrade strategy to take in to account the key identifiers. This can be done once, or over a predetermined period as is explained in more detail with regards to the method of FIG. 3C. In one or more embodiments of the invention this can be done continuously until the upgrade is actually started as will be discussed in more detail with regards to FIG. 3D.

In Step 310, a final application upgrade strategy is generated. In one or more embodiments of the invention, the device emulation agent may generate the final application upgrade strategy. The final application upgrade strategy may include the key identifier as discussed above in step 308 and other information such as boot time delay(s), user input can also be used in developing the final application upgrade strategy.

Once the final application upgrade strategy is determined, it is sent in step 312 to the upgrade manager. The upgrade manager in one or more embodiments of the invention can be part 100 of FIG. 1. The upgrade manager maintains the upgrade strategy and in one or more embodiments of the invention updates the upgrade strategy as key identifiers and other issues related to the upgrade change. In step 314, once the conditions of the final application upgrade strategy and/or based on user/administrator preference the upgrade manager performs the upgrade according to the upgrade strategy and the method ends.

Figure 3B:
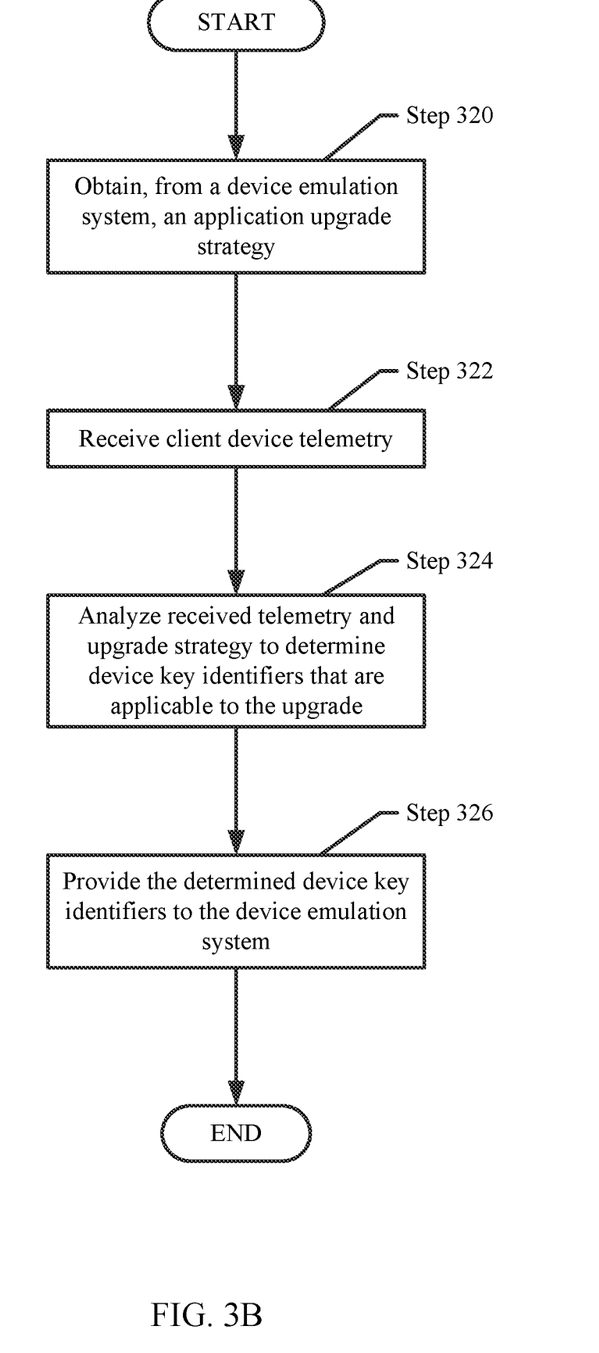

Turning now to FIG. 3B, the method shown in FIG. 3B may be performed by, for example, the application upgrade monitoring agent (e.g., 132, FIG. 1), the device emulation orchestration engine (e.g., 210, FIG. 2), the device emulation agent (e.g., 222, FIG. 2), and the client device upgrade manager (e.g., 100, FIG. 1). Other components of the system illustrated in FIG. 1 may also contribute to the performance of the method shown in FIG. 3B without departing from the scope of the invention.

In step 320, the device emulation system produces an application upgrade strategy. This is described in more detail with regards to step 304 of FIG. 3A. Other means besides those described with regards to step 304 for producing an application upgrade strategy can alternatively be used in one or more embodiments of the invention for producing the application upgrade strategy in step 320.

Once the upgrade strategy is determined and obtained, in step 322 of one or more embodiments of this invention, the emulation system also receive the device telemetry. According to one or more embodiments of the invention the telemetry is obtained with PowerShell commands or other scripting-based commands. The telemetry can include such statistics as battery status (whether the system is operating on battery power or on external power such as that provided by a power utility or generator). The telemetry in one or more embodiments of the invention can in addition or alternatively include remaining storage space, application usage patterns, and other operating statistics of the system.

Based on the telemetry received in step 322 and the upgrade strategy obtained in step 320, in one or more embodiments of the invention, the invention in step 324, analyzes both the telemetry and upgrade strategy to determine key identifiers that are applicable to the update/upgrade in step 324. Based on received telemetry and application statistics obtained from the telemetry as well as initial application upgrade strategy key identifiers or system statistics can be determined which is provided in step 326 to the device emulation system for forming an updated application upgrade strategy (e.g., steps 306 and 308 of FIG. 3A).

In a non-limiting example, if telemetry indicates that the system is running on battery power and the application upgrade strategy indicates that the upgrade would take a significant amount of time as currently configured, accordingly to one or more embodiments of the invention, the device emulation system may determine that the upgrade strategy should consider the time left before the battery is completely discharged at a current rate of discharge. Thus, in step 324 it would be determined that the amount of time left before a battery completely discharges at a current rate of discharge is a key identifier, as any update would fail if the system exhausted its battery power prior to the update/upgrade being completed.

Other non-limiting examples could include the amount of space left on client storage devices, network capacity, historical system/application usage, and any other characteristic of the system and/or application that is critical to upgrade/update being successfully performed.

In one or more embodiments of the invention, if the system determines that the current upgrade strategy needs to have a significant portion of local storage available on the client device, but the telemetry indicates that this amount of storage is not available, then storage space would become a key identifier and in step 308 of FIG. 3A, the method would update the strategy to take in account the limited amount of storage space on the local storage of the client device. However, in one or more embodiments of the invention, if the system determines that network capacity is limited, then the key identifier would be network capacity and in step 308 of FIG. 3A the method would update the strategy to use more local storage on the client device, in order to limit network usage. Other examples besides battery usage, storage capacity, and network capacity, which are not specifically discussed here are conceived of and included in the invention.

As previously discussed, in step 326, one or more embodiments of the invention provide the determined key identifiers to the device emulation system. Alternatively, the key identifiers can be provided to other components and aspects of the system such as a client device upgrade manager (FIG. 1, part 100), the application upgrade monitoring agent (FIG. 1, part 132) and/or the application upgrade repository (FIG. 1, part 134) as appropriate. The key identifiers can also be identified to a user or administrator by a graphical user interface or by other means. After the device emulation system or other pertinent components of the system receives the device key identifiers, the method of FIG. 3B ends.

Figure 3C:
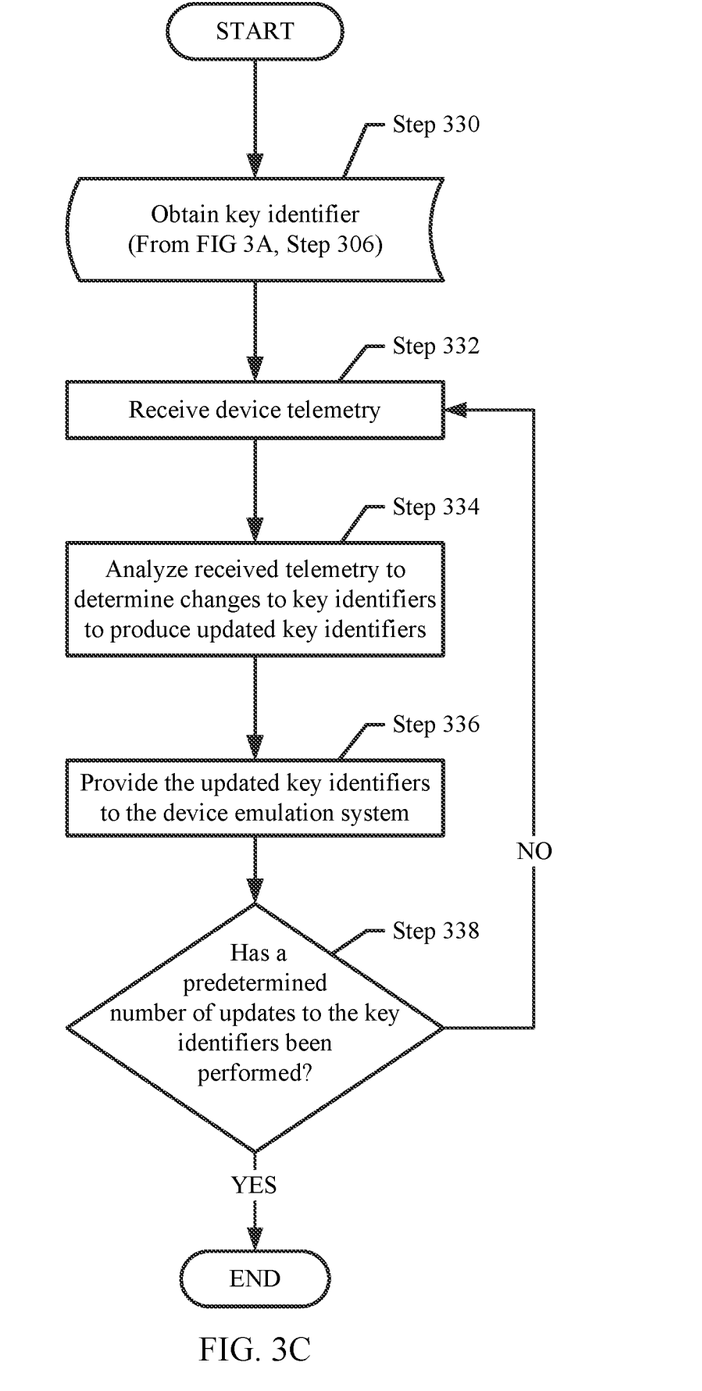

Turning now to FIG. 3C, the method shown in FIG. 3C may be performed by, for example, the application upgrade monitoring agent (e.g., 132, FIG. 1), the device emulation orchestration engine (e.g., 210, FIG. 2), the device emulation agent (e.g., 222, FIG. 2), and the client device upgrade manager (e.g., 100, FIG. 1). Other components of the system illustrated in FIG. 1 may also contribute to the performance of the method shown in FIG. 3C without departing from the scope of the invention.

In Step 330, the device emulation system obtains the key identifiers for example from step 306 in FIG. 3B. The key identifiers can also be provided by other methods including in one or more embodiments from a user/administrator or by other processes including those discussed with step 306 of FIG. 3A.

Once one or more key identifiers is obtained in step 330, the device emulation system also receives device telemetry at step 332. The telemetry is related to that of the key identifiers identified in step 330 and as discussed above with regards to the method of FIG. 3B can include such things as the client device is on battery power and has a specific amount of time left before the battery completely discharges at a current rate of discharge. Other key identifiers are device storage, network capacity, application use, and any other device or application statistics that is determined in the method of FIG. 3B to be a key identifier.

Once both the key identifier and device telemetry is obtained, in step 334, one or more embodiments of the invention use this telemetry to determine if any of the key identifiers has changed. For example, if device storage is the key identifier, the system would look to see if device storage has increased or decreased.

If a key identifier has changed as determined in step 334, the updated key identifier is provided to the device emulation system in step 336, to update the upgrade strategy as described in more detail with regards to step 308 of the method of FIG. 3A. Alternatively if any changes in the key identifiers is such that no change is needed for the upgrade strategy, the updated key identifier can be noted or discarded as appropriate.

Also, it can be determined that a different attribute of the system or application is a key identifier and that a previous key identifier is no longer pertinent. In such a case, in one or more embodiments of the invention, the upgrade strategy, as determined in step 308 of the method of FIG. 3A, would be updated to consider the new key identifier. Such an update for example, in a non-limiting example, would be if the key identifier were remaining battery time and external power was restored, the remaining battery time may no longer be pertinent and different key identifiers may become more pertinent to the upgrade strategy.

In step 338 it is determined if a predetermined number of updates to the key identifier has been performed. This may be a preset amount established by the device manufacturer, update provider, administrator, or other concerned party. Alternatively, in one or more embodiments of the invention the number of updates may be related to a preset amount of time in which it is assumed that the device emulation system can adequately emulate the device in order to properly produce a final upgrade strategy in step 310 of FIG. 3A. This would be advantageous, for example, if the key identifier were the remaining battery time, to have the device emulation system monitor this key identifier over a period long enough to determine that the system is not just momentarily unplugged for maintenance or other reasons.

If the method determines that number of updates to the key identifier or time has not occurred then the method proceeds back to step 332, where the device telemetry is continued to be monitored in order to update the key identifiers. If rather, at step 338 it is determined that the number of updates to the key identifier or time has been met, then the method ends.

Figure 3D:
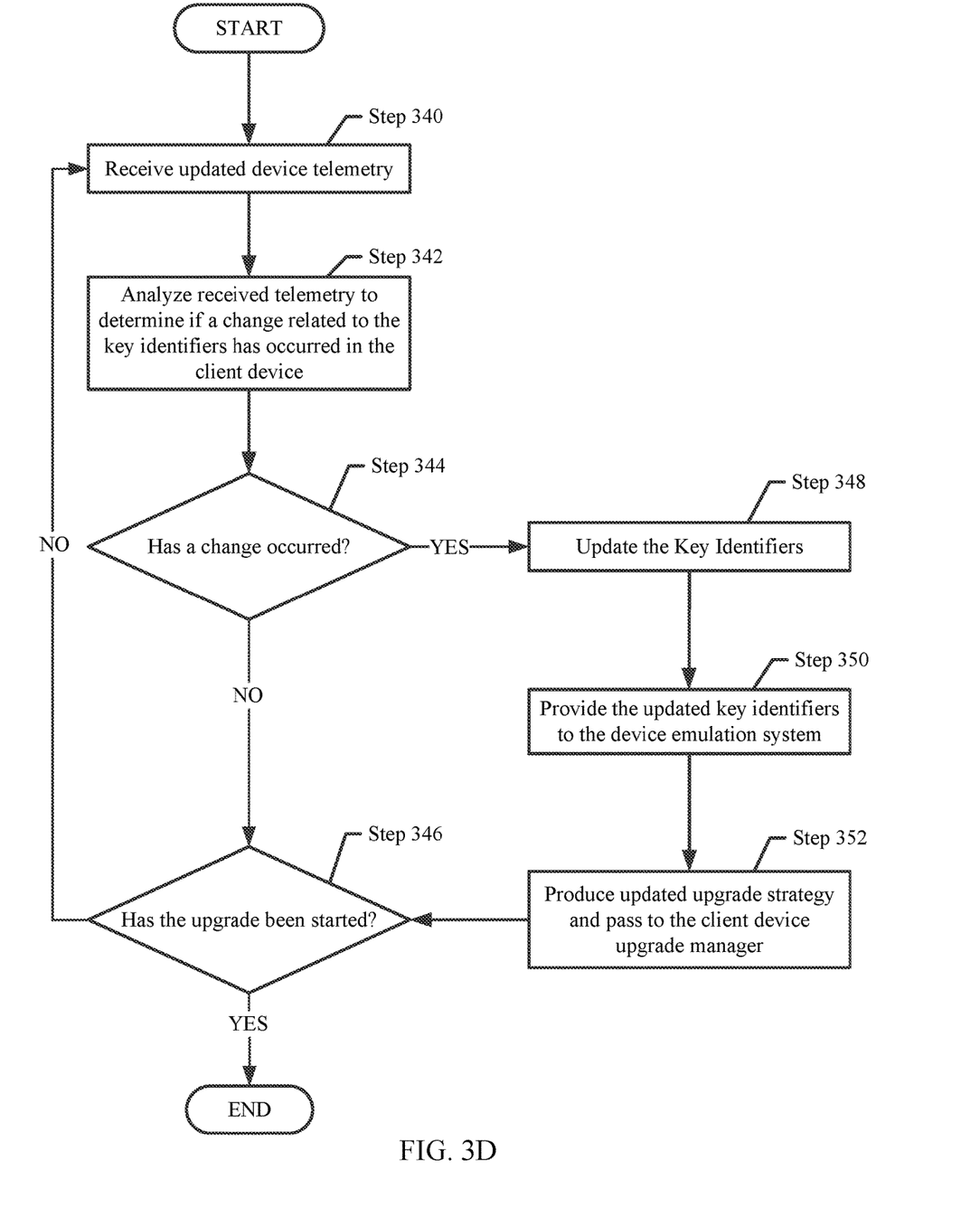

Turning now to FIG. 3D, the method shown in FIG. 3D may be performed by, for example, the application upgrade monitoring agent (e.g., 132, FIG. 1), the device emulation orchestration engine (e.g., 210, FIG. 2), the device emulation agent (e.g., 222, FIG. 2), and the client device upgrade manager (e.g., 100, FIG. 1). Other components of the system illustrated in FIG. 1 may also contribute to the performance of the method shown in FIG. 3D without departing from the scope of the invention.

In step 340, the method receives updated device telemetry. In one or more embodiments of the invention this step is performed after step 312 in FIG. 3A. Alternatively, it can be performed at any time after the key identifiers are identified.

In one or more embodiments of the invention, the client device upgrade manager performs step 340. In other one or more embodiments of the invention, step 340 may be performed by the device emulation system or other components of a system such as that shown in FIG. 1.

Once the telemetry is received from the system, it is analyzed in step 342 and step 344 to determine if a change related to the key identifiers has occurred in the client device. If the change has occurred in step 344 the method proceeds to step 348. If a change has not occurred, the method proceeds to step 346.

In step 348, the client device upgrade manager or other component of the system as discussed with regards to step 340, updates the key identifiers to have the new values obtained from the telemetry received in step 340. The updated key identifiers are provided to a device emulation system in step 350, which then performs a new emulation of the system to produce an update upgrade strategy that considers those changes to the key identifiers. These updates occur much in the way that was discussed with regards to FIGS. 3B and 3C.

Once the updated upgrade strategy is produced in step 352, it is passed to the client device upgrade manager, for implementation. In one or more embodiments of the invention this implementation may be automatic. In other embodiments, the client device upgrade manager may present the final or updated upgrade strategy to the user or administrator of the system and then perform the upgrade/update according to instructions received from the user or administrator.

The method then proceeds to step 346. Step 346 determines if the client device upgrade manager has started the upgrade. If the upgrade has not started, the method continues to step 340 and continues to receive updated device telemetry periodically or continuously in order to obtain an upgrade strategy that best considers the current status of the system and its applications.

Once it is determined that the upgrade/update has started in step 346, in one or more embodiments of the invention, the method ends. Alternatively, the method in one or more embodiments of the invention can end after the upgrade/update successfully completes or at a different point in the upgrade/update.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of this invention may improve the operating and upgrading of computing devices and system. More specifically one or more embodiments of the invention may receive information related to a plurality of application upgrades from an application monitoring agent. Based on the received information, a device emulation will be requested, and an emulation will be performed in response to generate an application upgrade strategy along including such things as emulated (e.g., predicted) upgrade times. In order to produce a more refined upgrade strategy the various embodiments also consider key aspects of the device and the upgrades to produce one or more key identifiers. The key identifiers are monitored throughout the upgrade process and are used to refine the upgrade strategy.

In response to the upgraded strategy as well as user or administrator feedback, the final application upgrade strategy will be initiated (e.g., instantiated, executed, etc.). This advantageously allows for the upgrade process to be customized to a particular electronic device/system resulting in less inconvenience and issues with performing the upgrade. One or more embodiments of the invention further provide the advantage of allowing a user or administrator to have a much clearer view about the upgrade process and allow them to customize both the upgrade and the system. These and other features of the various embodiments of the invention will increase the likelihood that an upgrade will be performed and completed successfully in a timely manner.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for upgrading a client device, the method comprising:
   performing an emulation in a device emulation system to generate an application upgrade strategy that applies at least one application upgrade on the client device;
   determining, by the device emulation system, using the application upgrade strategy and client device statistics, at least one key identifier of the client device;
   using, by the device emulation system, the at least one key identifier to modify the application upgrade strategy to produce a final application upgrade strategy; and
   sending, by the device emulation system, the final application upgrade strategy to the client device upgrade manager to perform the application upgrade strategy.

2. The method of claim 1, wherein the key identifier is an indication that the client device is running on battery power.

3. The method of claim 2, wherein if the client device is running on battery power, the key identifier further comprises an amount of time left before a battery is completely discharged at a current rate of discharge.

4. The method of claim 1, wherein the key identifier is an amount of space left on at least one storage device associated with the client device.

5. The method of claim 1, wherein:
the client device statistics are determined with telemetry, from the client device, received by the device emulation system; and
the at least one key identifier is determined based on at least the client device telemetry and an estimated time that an upgrade will take from the application upgrade strategy.

6. The method of claim 1, wherein the client device upgrade manager displays the final application upgrade strategy on a graphical user interface of the client device.

7. The method of claim 1, wherein the client device upgrade manager automatically performs at least the application upgrade based on the final application upgrade strategy.

8. A non-transitory computer readable medium comprising computer readable program code, which when executed by a computer processor enables the computer processor to perform a method for upgrading a client device, the method comprising:
performing an emulation in a device emulation system to generate an application upgrade strategy that applies at least one application upgrade on the client device;
determining, by the device emulation system, using the application upgrade strategy and client device statistics, at least one key identifier of the client device;
using, by the device emulation system, the at least one key identifier to modify the application upgrade strategy to produce a final application upgrade strategy; and
sending, by the device emulation system, the final application upgrade strategy to a client device upgrade manager to perform the application upgrade strategy.

9. The non-transitory computer readable medium of claim 8, wherein the key identifier is an indication that the client device is running on battery power.

10. The non-transitory computer readable medium of claim 9, wherein if the client device is running on battery power, the key identifier further comprises an amount of time left before a battery is completely discharged at a current rate of discharge.

11. The non-transitory computer readable medium of claim 8, wherein the key identifier is an amount of space left on at least one storage device associated with the client device.

12. The non-transitory computer readable medium of claim 8, wherein:
the client device statistics are determined with telemetry, from the client device, received by the device emulation system; and
the at least one key identifier is determined based on at least the client device telemetry and an estimated time that an upgrade will take from the application upgrade strategy.

13. The non-transitory computer readable medium of claim 8, wherein the client device upgrade manager displays the final application upgrade strategy on a graphical user interface of the client device.

14. The non-transitory computer readable medium of claim 8, wherein the client device upgrade manager displays the final application upgrade strategy on a graphical user interface of the client device.

15. A system comprising:
a client device;
a client device upgrade manager; and
a device emulation system that includes at least one processor and a memory comprising instructions, which when executed by the at least one processor, performs a method comprising:
performing an emulation in the device emulation system to generate an application upgrade strategy that applies at least one application upgrade on the client device;
determining, by the device emulation system, using the application upgrade strategy and client device statistics, at least one key identifier of the client device;
using, by the device emulation system, the at least one key identifier to modify the application upgrade strategy to produce a final application upgrade strategy; and
sending, by the device emulation system, the final application upgrade strategy to the client device upgrade manager to perform the application upgrade strategy.

16. The system of claim 15, wherein the key identifier is an indication that the client device is running on battery power.

17. The system of claim 16, wherein if the client device is running on battery power, the key identifier further comprises an amount of time left before a battery is completely discharged at a current rate of discharge.

18. The system of claim 15, wherein the key identifier is an amount of space left on at least one storage device associated with the client device.

19. The system of claim 18, wherein:
the client device statistics are determined with telemetry, from the client device, received by the device emulation system; and
the at least one key identifier is determined based on at least the client device telemetry and an estimated time that an upgrade will take from the application upgrade strategy.

20. The system of claim 15, wherein the client device upgrade manager displays the final application upgrade strategy on a graphical user interface of the client device.

* * * * *